2,898,314

COMPOSITION CONTAINING BAMBOO PARTICLES AND THERMOSETTING RESIN

Roger M. Shepardson, Richmond, Va.

No Drawing. Application January 7, 1958
Serial No. 707,469

1 Claim. (Cl. 260—17.2)

It is an object of this invention to provide a molded board comprising: a mixture of bamboo particles with a resinous binder, which board will have physical properties equaling or surpassing those of cherry lumber.

While this board will be described with particular reference to its use as a mounting material for metal plates used in the photo-engraving and electrotyping industries, the same properties which suit it to such use will suggest its adaptability to other quite non-analogous uses. It is not intended, therefore, to limit this board only to use as a mounting material for metal plates as aforesaid.

Numerous tests on cherry lumber as well as various proposed substitute materials, establish certain "ideal" properties and characteristics. These are:

(1) *Dimentional stability.*—This fairly generic term covers a number of specific properties:

(a) Absorption of water or for that matter, loss of absorbed water, in most composite substances results respectively in swelling or shrinkage. To approach the ideal condition, the material must have a minimum tendency to absorb or to lose water.

(a') From the standpoint of physical chemistry, the process of gaining or losing moisture content in the form of moisture vapor rather than in the form of liquid water, is a quite distinct process but so far as dimensional stability is concerned, the net result is the same whether the transaction occurs in the liquid or the vapor form. Therefore, resistance to loss or gain of moisture through changes of humidity in the circumambient atmosphere must be minimized.

(a") Another facet of minimized gain or loss of water or moisture vapor lies in the resistance to acids, alkalies, organic solvents and greases. Absorption or loss of these should be minimized. Since, however, the loss or absorption of any of these may occur by reaction as well as by non-reactive processes of physical or colloidal chemistry, resistance to the substances noted must include chemical inertness as well as physical imperviousness.

(b) All known substances considered with respect to any desired property have minimum and maximum temperatures within which such properties may exist. Composition boards of the type here under consideration, should retain their desirable properties through a temperature angle of 0° to 350° F.

(c) Most substances respond dimensionally to changes in temperature. If the substance is not homogeneous, the result of temperature change is warping or other distortion. If the substance is homogeneous, the result of temperature change is a uniform, overall swelling or shrinking. Either of the effects noted is objectionable when extreme dimensional stability is required. The product, therefore, so far as possible, (i) should be homogeneous throughout any cross-section and (ii) inherently should have a minimum coefficient of thermal expansion.

(2) *Physical strength.*—This also is a generic term covering a variety of specific properties:

(a) High tensile strength is a requirement. As a matter of testing, this is usually measured by subjecting a specimen to tension. In practice, while this material seldom will be loaded directly in tension, the strength of the material in this respect is important because the resistance of the material to many forms of loading ultimately is determined by its tensile strength.

(b) High load-bearing strength is a requirement and is itself a composite quality made up of compressive strength measured by conventional tested methods, flexibility as measured by the deflection of a predetermined span of predetermined cross-section under a predetermined load and strength in shear as conventionally tested. Since the value of each component has a direct relationship to the value of the composite, each component should have maximum value.

(3) *Impact resistance.*—There is no universally acceptable impact resistance test. The present invention is concerned with two aspects of impact resistance: first, the material must not be brittle to the point of rupture under such impacts as ordinarily it may be expected to encounter, and second, it must be sufficiently resilient to resist permanent deformation as a result of such impacts. Roughly speaking, it should be possible to drop a test specimen on one corner with an impact energy of 50 to 60 foot pounds without either rupture or permanent deformation.

(4) *Machinability.*—This, too, is a generic term indicating that the material must be easy to saw, turn, plane, rout and in general be subjected to most shop practices without chipping or flagging.

(5) *Surfaceability.*—The surface must be capable of being planed or sanded to extreme smoothness and opposed surfaces must be workable to parallelism to insure uniform thickness. This obviously requires not only that the structure be homogeneous but that the individual particles be restricted in size and substantially uniform in shape.

(6) *Nailability.*—Most commercially acceptable flake or particle boards will receive nails or screws without splitting and will hold nails or screws against withdrawal with power greater than the minimum holding power of the wood from which they are made. The particular use here contemplated, namely as backing for photo-engravers' and electrotypers' plates, requires that the board receive and hold nails within $\frac{1}{16}$" of the edge without splitting or crumbling.

(7) *Economy.*—Since the raw materials are purchased by the pound and the final product is sold by the square foot, it is obvious that density must be held to a minimum consistent with the other qualities hereinabove discussed. Since, also, even in the manufacture of conventional particle boards in which the resin amounts to only from 4% to 8% of the dry weight of wood, the cost of resin represents around 35 to 50% of the total cost of the materials, it is clear that the proportion of resin and the unit cost of resin should be minimized consistent with the attainment of other requisite qualities.

Various attempts have been made to satisfy the above requirements but except for the present invention, none acceptably has met all of such requirements. Bamboo was selected as a starting material because its solids content is made up primarily of fibre vascular strands crowded so tightly together at the periphery as to make a thick and relatively dense outer layer with very few pith cells. Moreover, even within the fibrovascular strands or bundles the bast fibres predominated. Bamboo, moreover, is highly siliceous in content, producing a degree of hardness virtually unique among vegetable products.

It was found that by reducing green bamboo to a relatively fine particle size and accepting only that portion of the particles passing a 16 mesh screen, a suitable base material was provided. These particles are then dehydrated to a weight loss of approximately ⅓ of the original green weight. As yet there has been no opportunity for specific laboratory confirmation but it seems overwhelmingly probable that the bulk of the weight loss due to dehydration occurs in the non-bast portions of the bamboo. 15.5 pounds of fines were mixed with 3.25 pounds of urea formaldehyde resin and with 1% (based on the dehydrated weight of fines) of a paraffin base wax. The resulting mixture was spread in a tray 2'x2' in horizontal dimensions. As loosely deposited, this made a layer approximately 4" in thickness. The loaded tray was placed in a platen press in which the platens were maintained at 300° F. The platens were closed against spacers ⅞" thick at closing, the pressure gauge on the press read 1500 p.s.i. but since the platens are closed against limiting stops, gauge pressure readings are only very generally indicative of the pressure exerted between adjacent particles in the board. The press was kept closed for approximately 20 minutes, after which the press was opened and the boards removed. It was noted that boards directly out of the press had a tendency while still hot to follow the contour of the surface upon which they were placed. It is a requirement, therefore, that newly made boards immediately be placed or stacked upon flat surfaces. The boards rigidify on cooling and once cooled, no particular stacking care is needed.

Upon examination of the cooled, rigidified boards, it was noted that the outer edges appeared to lack sufficient density and strength. Uniform density was encountered beginning about 4" inward from the outer edge. The 4" trim, on examination, was found to be highly vulnerable to moisture. Once the unsatisfactory edges were trimmed, the remaining board was found to meet fully all of the above listed requirements, rating equal or superior to cherry lumber in every department and particularly under item (7) "Economy," and item (6) "Nailability." As regards the latter, the screw holding power of the board is unique.

In addition to the above described test, additional tests were made of boards made from flaked bamboo. The flaking process is accomplished by knives extending generally parallel to the grain and moving generally transverse the grain. With this treatment, acceptable flakes run typically .015"x.25"x.5", though of course, there are wide variations between individual flakes. Test boards were made with 8% resin, the final board being ¾" thick and at 10% resin with a final thickness of ⅞". Time, temperature and pressure were the same in all cases. These flake boards compared very well with the first discussed board formed of fines. However, some minute flagging was noted in sawing and routing and even with a 4" edge trim, the remaining edge fell somewhat below optimum density and grain.

It is always dangerous to attempt to deduce a trend from such limited available data. It would appear, however, that uniformity of particle shape, as well as uniformity of particle size contributes to homogeneity with resultant gains under requirements (1)(c), (i) and requirement (5). Uniformity of particle shape increases with the fineness of the mesh used to classify the accepted particles. When vibrating screens are used, and they must be for commercial results, a substantial proportion of elongated particles having a transverse cross-section adequate to pass the mesh, will go into the accepted stock but the proportion of these drops rapidly with increased fineness and for all practical purposes, disappears at about 16 mesh. To refine the mesh further would decrease the yield, increase the resin requirement and increase the density of the final board, all of which trends are antithetical to requirement 7 above. So far as as particle rather than flake boards are concerned, it seems reasonable that about 14 mesh on the coarse side and about 20 mesh on the fine side would represent the limits of practicability.

As to resin content, about 8% of resin solids based on the dry weight of acceptable bamboo certainly would seem to be the lower limit, while about 15% resin solids on the dry weight of acceptable bamboo would seem to approximate the upper limit, at least so far as requirement (7) is concerned.

As to the flake board above described, probably the same limits of resin content would apply and for the same reasons. The classification of acceptable flakes, however, is not so easily delimited. The "typical" flake is established by the initial sizing and setting of the knives used for flaking. The flakes thus produced, however, are subjected to dimensional attrition in their subsequent handling and because of their geometric proportions, are only poorly susceptible to ordinary classification methods. Screening methods can only be relied on, therefore, to eliminate only grossly over or undersized particles and the quality of the accepted stock is governed in the last analysis, by close control over all the steps of the preparatory process. The unique properties of bamboo, however, do confer on flake board the closest approximation of the performance of the 16 mesh particle board. A typical particle board of conventional practice treats as acceptable all particles passing a 4" mesh screen. Such boards, however, even using bamboo as a starting material, are unsatisfactory within most of the requirements above set forth.

I claim:

A composition of matter comprising: a heat and pressure cured and molded mixture of comminuted, at least partially dehydrated particles of bamboo sized to pass screens of from about 14 mesh to about 20 mesh and a thermosetting resin selected from a group consisting of urea-formaldehyde, phenol-formaldehyde and melamine-formaldehyde, said resin being present in proportion of from about 8% to about 15% of the weight of dehydrated bamboo particles, said composition being characterized by extreme dimensional stability, high physical strength, excellent machinability and high impact resistance, all at least equal to those qualities in natural cherry lumber.

References Cited in the file of this patent
UNITED STATES PATENTS
2,352,740   Shannon _____ July 4, 1944